Patented Jan. 26, 1943

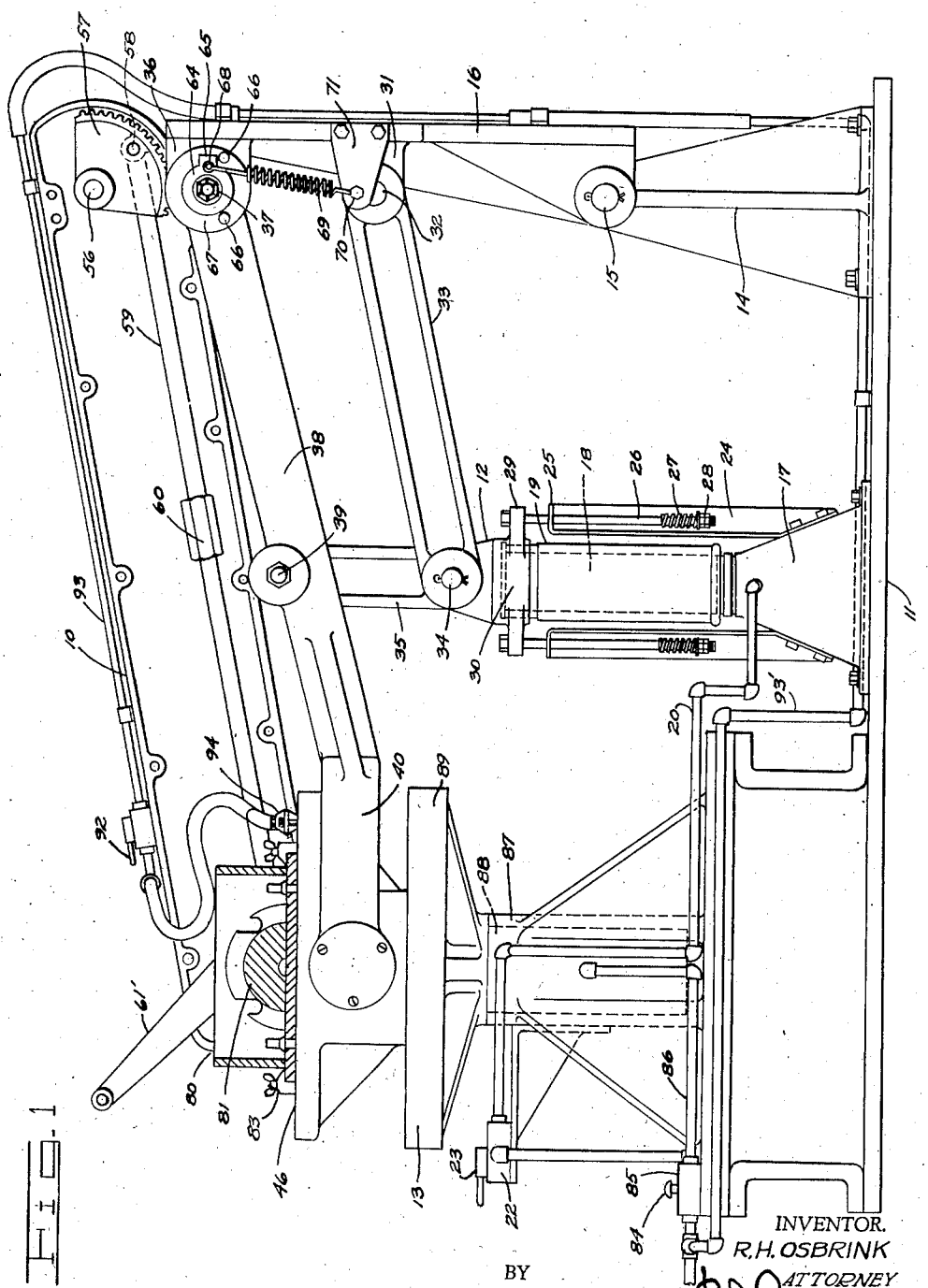

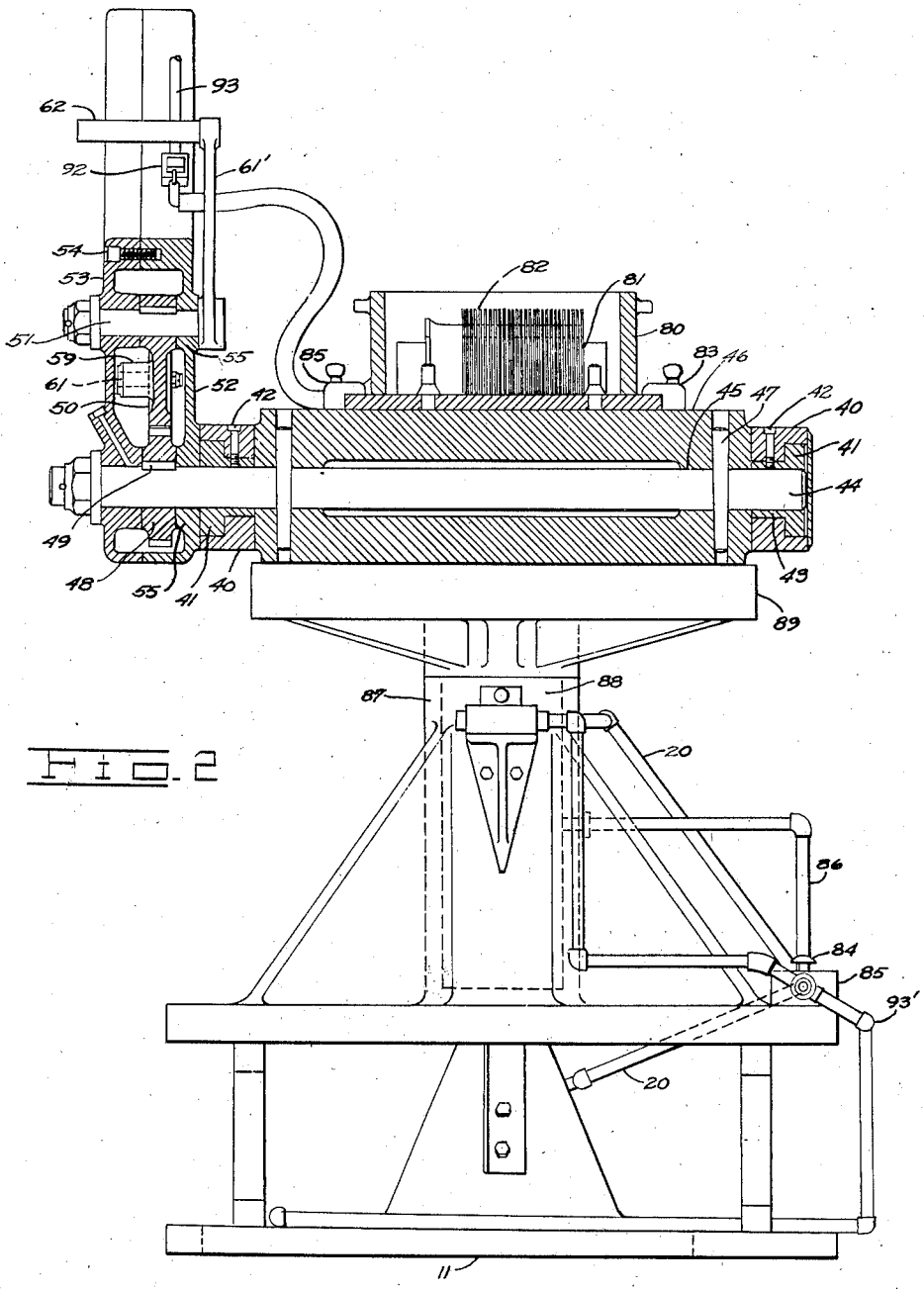

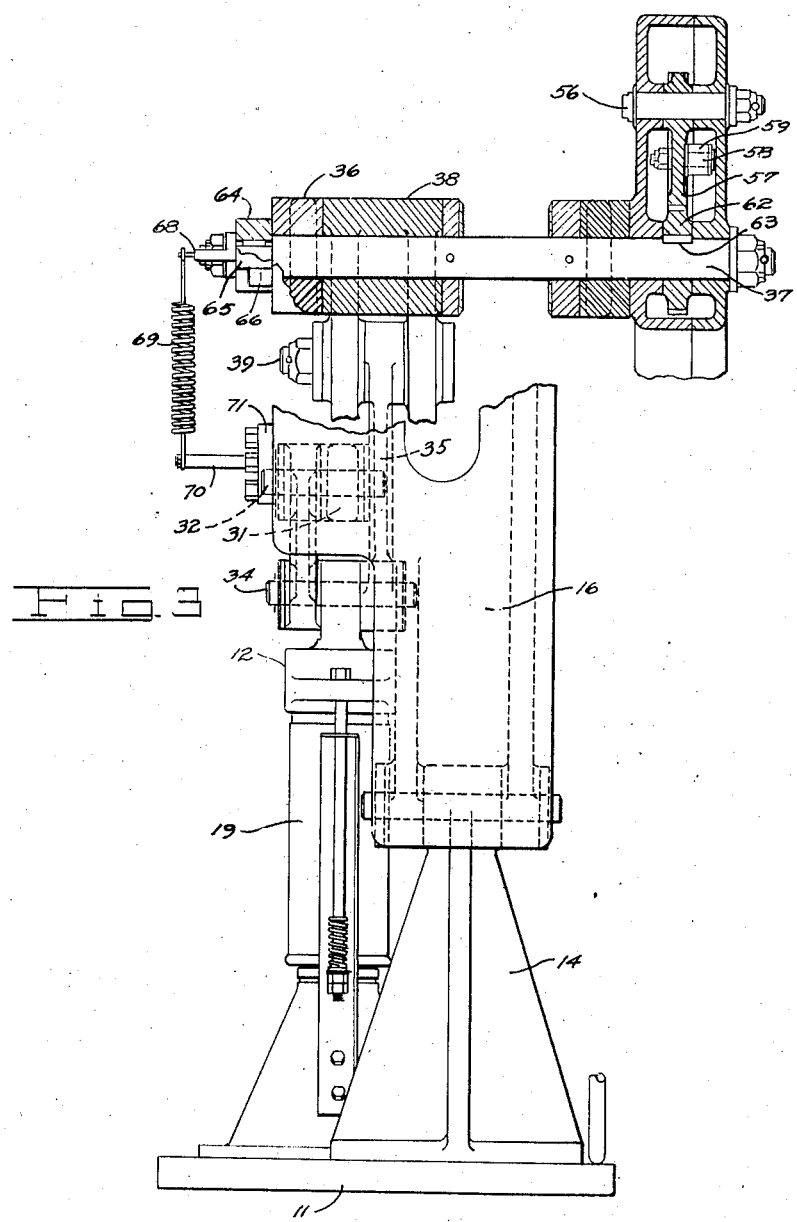

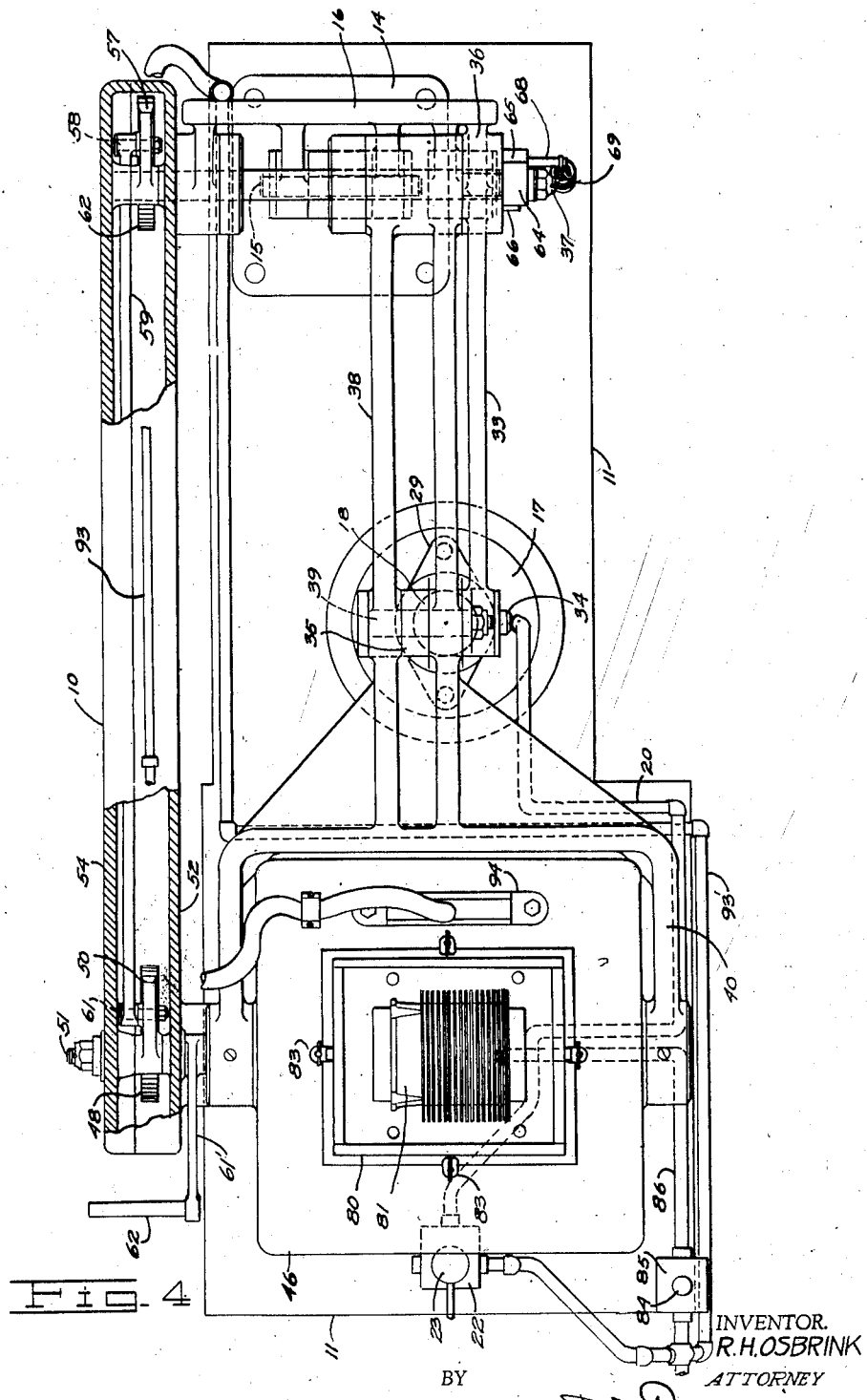

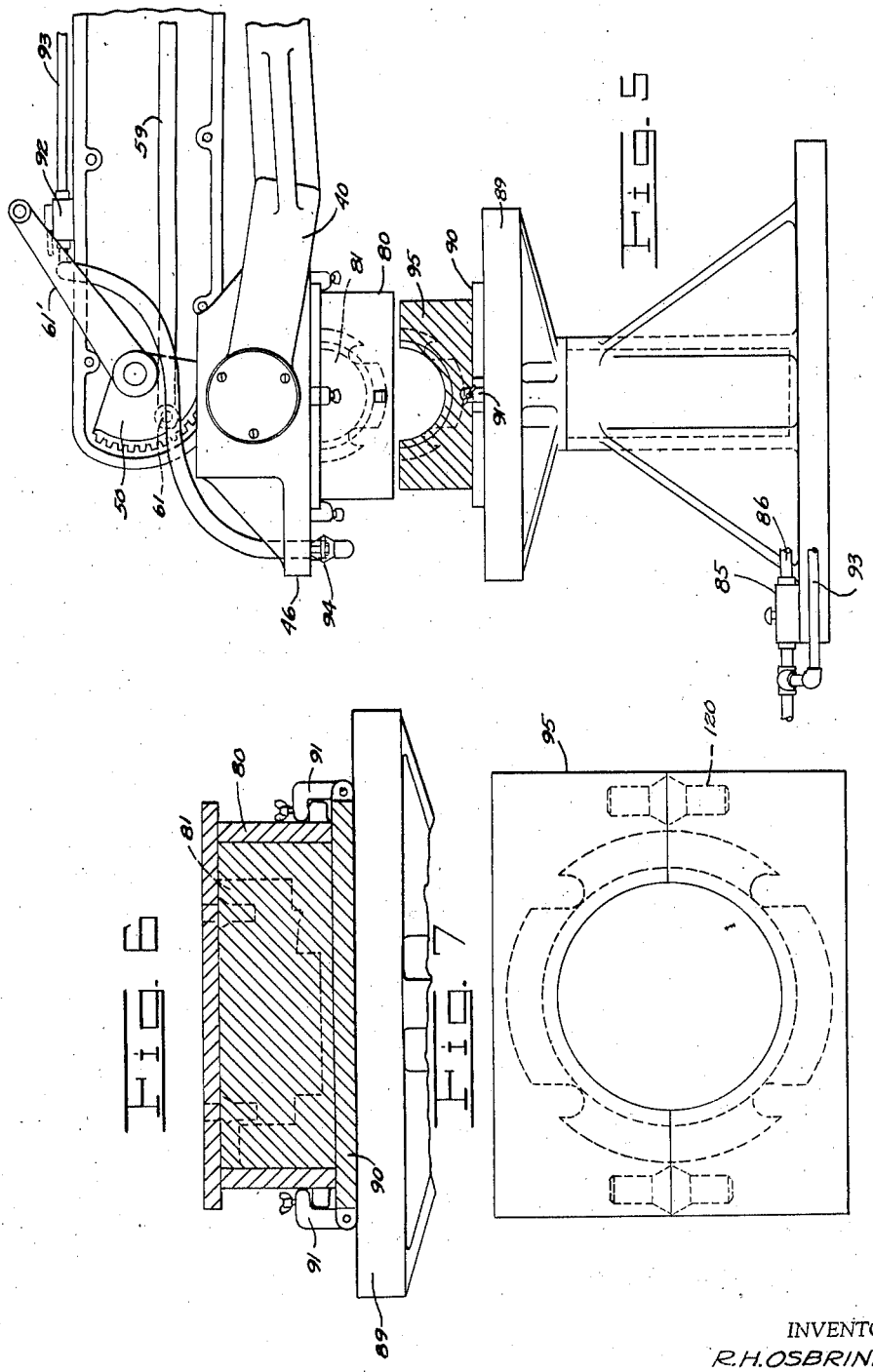

2,309,271

UNITED STATES PATENT OFFICE 2,309,271

APPARATUS FOR MAKING MOLD MEMBERS

Raymond H. Osbrink, Los Angeles, Calif.

Application November 22, 1941, Serial No. 420,097

14 Claims. (Cl. 22—32)

This invention relates to an apparatus for making a mold member.

One general object of my invention is to provide a novel apparatus for accurately making a mold member.

A specific object of my invention is to provide a novel apparatus for moving a pattern from a mold member.

A more specific object of my invention is to provide an apparatus wherein novel means is provided for simultaneously vibrating and withdrawing a pattern and a mold flask from a mold member.

Another object of this invention is to provide a mold member forming apparatus including means for first vibrating a mold flask and its contents during an initial operation and thereafter holding the mold flask contents stationary while simultaneously vibrating the pattern and moving it rectilinearly from the mold member.

Another object of the invention is to provide a mold forming apparatus wherein a pattern member is mounted for movement in a straight line thus permitting the pattern to be drawn from the compacted sand and wherein the pattern moving member is of such nature that the portion thereof which supports the pattern may be vibrated to facilitate removal of the pattern.

A further object of this invention is to provide a mold member making apparatus including a platen for holding a mold flask together with novel means for mounting the platen for rotation about an axis.

An additional object of the invention is to provide means for supporting a platen for movement about the axis of a shaft and wherein novel means is provided for moving the shaft axis in a single plane.

An additional object of this invention is to provide a mold member making apparatus including a vertically shiftable piston and linkage members operable by the piston to move a mold flask support member vertically.

Another object of this invention is to provide a parallel link operated apparatus for moving a pattern from a mold member.

A further object of the invention is to provide an apparatus including a platen mounted to rotate about an axis through 180 degrees, together with novel means to hold the platen in either extreme position and means for bodily shifting the axis of the platen.

Other objects and advantages of the invention will be apparent from the following description taken in connection with the accompanying drawings wherein:

Fig. 1 is a side elevation partly in section showing the apparatus;

Fig. 2 is a front end view of the apparatus in elevation on a large scale and showing the platen and associated parts in section;

Fig. 3 is a rear end view showing the apparatus with parts broken away and parts in section;

Fig. 4 is a top plan view of the apparatus with parts broken away;

Fig. 5 is a fragmentary side elevation showing the front end of the machine with the lifting arm partly raised;

Fig. 6 is a sectional detail showing the top of the jolt table and the pallet and mold flask thereon; and Fig. 7 is a sectional view showing a pair of mold members made with the apparatus.

Referring to the drawings by reference characters, I have shown my invention as embodied in a mold member making apparatus which is indicated generally at 10. As shown, the apparatus includes a base 11 on one end of which an actuating member indicated generally at 12 is mounted. At the other end the base supports a jolt table indicated at 13.

The base portion 11 includes an upright 14 which supports a pivot pin 15 which in turn pivotally supports a swivel arm 16. Mounted by the support 11, I show a piston base 17 which is surmounted by a piston 18. The piston is shown as stationary and receives a cylinder 19 which latter is reciprocated by compressed air with the air supplied through a pipe 20 and with control effected by a valve 22. The construction is such that when the valve 22 is operated by the control member 23, the cylinder is moved upwardly, and when the valve is again operated the cylinder is moved downwardly. The details of the piston, cylinder and valve form no part of the present invention.

The base 17 is provided with spaced brackets 24 having apertured end flanges 25 through which the limit rods 26 extend. These limit rods have springs 27 arranged on their lower ends with the springs held in place by nuts 28. The rods 26 are mounted in ears 29 arranged on the cylinder head 30 and the construction is such that when the cylinder 19 reaches the upper limit of its travel, the springs 27 will engage the flange 25 and thus resiliently limit the movement of the cylinder 19.

The swivel arm 16 is provided with an apertured ear 31 which receives a pin 32 which latter pivotally supports one end of a link 33 with the other end of the link 33 pivotally supported by a pin 34 arranged on the cylinder head 30. The pin 34 also pivotally supports a link 35.

The swivel arm 16 is also provided with an ear 36 which supports a shaft 37 and which latter pivotally engages one end of a lifting fork 38. An intermediate portion of the lifting fork engages a pin 39 which pivotally engages the upper end of the link 35. The axes of the pins 34 and 39 are spaced apart and the axes of the pins 32 and shaft 37 are spaced apart and the arrangement of the linkage is such that as the cylinder head reciprocates, the swivel arm 16 swings slightly about the axis of the pin 15 and the outer end of the lifting fork 38 which is remote from the shaft 37 is caused to move vertically and rectilinearly up and down.

The lifting fork 38 at the outer end includes arms 40 (see Figs. 2 and 4) which are spaced apart and which are recessed (Fig. 2) to receive bearing members 41 which are held in place by fastening members 42. The bearing members 41 are apertured as at 43 to receive a shaft 44. This shaft 44 is received in a bore 45 in a platen 46. The platen is held in place by pins 47 which pass through apertures in the platen and in the shaft 44.

The construction is such that the platen is free to rotate with the shaft 44 and this shaft 44 is free to rotate in its bearing 41.

In order to rotate the platen I show a gear 48 which is held on the shaft by a key 49 and the gear 48 meshes with a segmental gear 50 secured on a shaft 51. The gears 48 and 50 are arranged in a housing which includes parts 52 and 53 held together by screws 54. The parts 52 and 53 include apertured bosses 55 through which the shafts 44 and 51 extend.

The housing parts 52 and 53 are elongated and extend to a position above the swivel arm 16 where they support a shaft 56 which in turn supports a segmental gear 57. This gear 57 has a pin 58 thereon which pivotally engages one end of a connecting bar 59. The connecting bar includes a turnbuckle 60 by means of which the length may be adjusted. The bar 59 is also connected to a pin 61 mounted on the segmental gear previously described.

The shaft 51 is provided with a crank arm 61' which includes a handle 62. By operating this handle 62 the shaft 51 will be rocked thus rotating the gears 50 and 48 and reciprocating the connecting bar 59 to thus rotate the segmental gear 57. The segmental gear 57 meshes with a gear 62 which is secured to the shaft 37 by a key 63 so that the shaft 37 is rotated. The shaft 37 is provided with a collar 64 which includes an ear 65. This ear 65 is adapted to engage either one of a pair of stop pins 66 mounted on a boss 67 on the ear 36 on the swivel arm 16. The ear 65 includes a pin 68 which is engaged by one end of a tension spring 69 with the other end of the spring 69 engaging a pin 70 mounted on a spring bracket 71 secured to the swivel arm 16. The construction is such that when the handle 62 is rocked from one position to the other, the shaft 37 will be rocked thus causing the ear 65 to engage one or the other of the stop pins 66. This will cause the platen 46 to assume either of two positions 180° apart.

In the practice of my improved method and in operating the apparatus, a mold flask 80 is arranged on the pallet. This flask 80 has a pattern 81 secured therein. The walls of the mold flask have no draft and the blades 82 (to be described later) of the pattern 81 also have no draft. The mold flask is held in place by clamping means 83. The mold flask is partially filled with sand after which the operator steps on a button 84 which operates a valve 85 controlling the flow of compressed air through the pipe 86 to the cylinder 87 thus causing the jolt table to move rapidly up and down. The jolt table is of standard construction and includes a cylinder 87 with a piston 88 therein surmounted by a support table 89. The jolt table per se forms no part of the present invention.

During the described operation the mold flask is supported on the platen while the platen is supported on the jolt table 89 and as a result, the mold flask will be vibrated causing the sand to pack therein. Sufficient sand is placed in the flask until the latter is filled after which a cover 90 will be placed on the mold flask. This cover 90 is in effect a pallet and is secured in place by suitable clamping means 91. After the pallet is in place, the operator actuates the valve 23 to raise the platen and mold flask from the jolt table. After the platen is raised, the operator grasps the handle 61 and rotates the platen through 180°. This carries the mold flask through 180° to a position above the jolt table 89. The valve 23 is then operated to lower the platen which moves downwardly until the pallet 90 rests upon the jolt table 89 (see Fig. 6).

The operator then releases the clamps 91 so that the mold member may be lifted from the pallet. He then operates a valve 92 which controls flow through a conduit 93 furnishing compressed air from a pipe 93' to a vibrator 94 which is mounted on the platen.

The vibrator 94 per se forms no part of the present invention.

It will be seen that the platen, mold flask and pattern will be vibrated by the vibrator 94. While this is being done, the jolt table 89 remains stationary so that the pallet 90 will remain stationary, and the mold member 95 in the mold flask will remain stationary while the pattern and mold flask are being vibrated. While the vibrator 94 is operating to vibrate the platen, flask and pattern, the valve 23 is operated to cause the platen to be lifted. The platen moves vertically and the pattern 81 is drawn vertically from the mold member. The mold member remains on the pallet 90 and may be removed as soon as the mold flask and pattern have been withdrawn therefrom.

It will be understood that my method and apparatus may be employed for the making of mold members in which various articles can be cast. In the present disclosure the apparatus is described as employed for making mold members for the casting of airplane cylinder wall cooling jackets which are usually made of cast aluminum.

In Fig. 7 two of the mold members are shown. These members are aligned by pins inserted in cavities 120 in the mold members.

In the construction shown the lifting fork 38 and associated parts are of such nature that the platen can be vibrated to thus vibrate the pattern. The lever arm arrangement permits this desired vibration but at the same time restricts the movement of the platen so that the latter moves rectilinearly. In other words the lever arm constrains the pattern to move vertically but is not so rigid that vibration is prevented.

The jolt table 13 acts with a bumping or jarring motion to compact the sand. The motion of the platen when the pattern is being withdrawn is not a jolting or bumping motion but is a vibrating motion.

From the foregoing description it will be apparent that I have invented a novel apparatus for making mold members which is highly efficient for its intended purpose.

Having thus described my invention, I claim:

1. In an apparatus for making a mold member, a swivelled arm, a cylinder, a piston in the cylinder, means to actuate the cylinder, a link, means swivelly connecting said link to the cylinder head, means swivelly connecting the link to the swivel arm, a second link swivelly connected to the cylinder head, a lifting member, means to swivelly mount the lifting member intermediate its length to said second link, means to swivelly mount one end of the lifting member to the swivel arm, said lifting member, links and swivel arm being disposed to form a parallel link motion, a shaft mounted on said lifting member, and a platen mounted on said shaft.

2. In an apparatus for making a mold member, a swivelled arm, a reciprocating member, means to reciprocate the member, a link, means swivelly connecting said link to the member, means swivelly connecting the link to the arm, a second link swivelly connected to the member, a lifting member, means to swivelly mount the lifting member intermediate its length to said second link, means to swivelly mount one end of the lifting member to the swivel arm, said lifting member, links and swivel arm being disposed to form a parallel link motion, a shaft mounted on said lifting member, a platen mounted on said shaft, and means to rotate the platen.

3. In an apparatus for making a mold member, an arm swivelly mounted for movement about a horizontal axis, a cylinder on the base, a piston in the cylinder, means to actuate the cylinder, a link, means swivelly connecting said link to the cylinder head, a second pin swivelly connecting the link to the swivel arm, a second link swivelly mounted on said first pin, a lifting member, means to swivelly mount the lifting member intermediate its length to said second link, means to swivelly mount one end of the lifting member to the swivel arm, said lifting member, links and swivel arm being disposed to form a parallel link motion, and a platen rotatably mounted on said lifting member.

4. In an apparatus for making a mold member, a base, an arm swivelly mounted on the base for movement about a horizontal axis, a vertical cylinder on the base and spaced from the swivel arm, a piston in the cylinder, means to actuate the cylinder, a cylinder head on the cylinder, a link, a pin swivelly connecting said link to the cylinder head, a second pin swivelly connecting the link to the swivel arm, a second link swivelly mounted on said first pin, a lifting fork, means to swivelly mount the lifting fork intermediate its length to said second link, means to swivelly mount one end of the lifting fork on the swivel arm, said lifting fork, links and swivel arm being disposed to form a parallel link motion, said lifting fork having spaced arms, a shaft supported by said arms, a platen on said shaft, and means to rotate the platen through 180 degrees.

5. In an apparatus for making a mold member, a base, an upright on the base, an arm swivelly mounted on the upright for movement about a horizontal axis, a vertical cylinder on the base and spaced from the swivel arm, a piston in the cylinder, means to actuate the cylinder, a link, means swivelly connecting said link to the cylinder head, a second pin swivelly connecting the link to the swivel arm, a second link swivelly mounted on said first pin, a lifting member, means to swivelly mount the lifting member intermediate its length to said second link, means to swivelly mount one end of the lifting member to the swivel arm, said lifting member, links and swivel arm being disposed to form a parallel link motion, a shaft mounted on said lifting member, a platen keyed to said shaft, and means to rotate the platen through 180 degrees.

6. In an apparatus for making a mold member, a base, an arm swivelly mounted on the base for movement about a horizontal axis, a vertical cylinder on the base and spaced from the swivel arm, a piston in the cylinder, means to actuate the cylinder, a cylinder head on the cylinder, resilient means to limit the upward movement of the cylinder head, a link, a pin swivelly connecting said link to the cylinder head, a second pin swivelly connecting the link to the swivel arm, a second link swivelly mounted on said first pin, a lifting fork, means to swivelly mount the lifting fork intermediate its length to said second link, means to swivelly mount one end of the lifting fork on the swivel arm, said lifting fork, links and swivel arm being disposed to form a parallel link motion, said lifting fork having spaced arms, bearings in said spaced arms, a shaft in said bearings, a platen keyed to said shaft, and means to rotate the platen through 180 degrees.

7. In an apparatus for making a mold member, a swivelled arm, a cylinder, a piston in the cylinder, means to actuate the cylinder, a link, means swivelly connecting said link to the cylinder head, a pin swivelly connecting the link to the swivel arm, a second link swivelly mounted on said first pin, a lifting member swivelly mounted intermediate its length to said second link, a shaft on said swivel arm swivelly engaging the lifting member, said lifting member, links and swivel arm being disposed to form a parallel link motion, a second shaft supported by said lifting member, a platen keyed to said second shaft, said second shaft, projecting beyond said platen on one end thereof, a support having a bore receiving said second shaft, a gear in said housing and keyed to said second shaft, a third shaft in said housing, a segmental gear mounted on said third shaft, a second segmental gear mounted on said support and disposed above the swivel arm, means connecting said segmental gears, a second gear meshing with said second segmental gear, and means to limit the rotation in each direction of said second gear.

8. In an apparatus for making a mold member, a base, an arm swivelly mounted on the base for movement about a horizontal axis, a vertical cylinder on the base and spaced from the swivel arm, a piston in the cylinder, means to actuate the cylinder, a link, means swivelly connecting said link to the cylinder head, a pin swivelly connecting the link to the swivel arm, a second link swivelly mounted on said first pin, a lifting member swivelly mounted intermediate its length to said second link, a shaft on said swivel arm swivelly engaging the lifting member, said lifting member, links and swivel arm being disposed to form a parallel link motion, a second shaft supported by said lifting member, a platen keyed to said second shaft, said second shaft projecting beyond said platen on one end thereof, a support having a bore receiving said second shaft, a gear in said housing and keyed to said second shaft, a third shaft in said housing, a segmental gear mounted on said third shaft, a second segmental gear mounted on said support and disposed above the swivel arm, means connecting said segmental gears, a second gear on said first shaft and meshing with said second segmental gear, a collar keyed on said first shaft, an ear on said collar, a disk on first shaft, means to prevent rotation of said disk, pins on said disk, said ear being adapted to engage either of said stop pins and a crank on said second shaft.

9. In an apparatus for making a mold member, an arm swivelly mounted for movement about a horizontal axis, a cylinder on the base and spaced from the swivel arm, a piston in the cylinder, means to actuate the cylinder, a link, means swivelly connecting said link to the cylinder head, a pin swivelly connecting the link to the swivel arm, a second link swivelly mounted on said first pin, a lifting member swivelly mounted intermediate its length to said second link, a shaft on said swivel arm swivelly engaging the lifting member, said lifting member, links and swivel arm being disposed to form a parallel link motion, a second shaft supported by said lifting member, a platen keyed to said second shaft, said second shaft, projecting beyond said platen on one end thereof, a support having a bore receiving said second shaft, a gear in said housing and keyed to said second shaft, a third shaft in said housing, a segmental gear mounted on said third shaft, a second segmental gear mounted on said support and disposed above the swivel arm, means connecting said segmental gear, a second gear on said first shaft and meshing with said second segmental gear, a collar keyed on said first shaft, and means to limit the rotation of said first shaft in each direction.

10. In an apparatus for making a mold member, a base, an arm swivelly mounted on the base for movement about a horizontal axis, a vertical cylinder on the base and spaced from the swivel arm, a piston in the cylinder, means to actuate the cylinder, a link, means swivelly connecting said link to the cylinder head, a pin swivelly connecting the link to the swivel arm, a second link swivelly mounted on said first pin, a lifting fork, means to swivelly mount the lifting fork intermediate its length to said second link, a shaft on said swivel arm swivelly engaging the lifting fork, said lifting fork, links and swivel arm being disposed to form a parallel link motion, a second shaft supported by said lifting fork, a platen keyed to said second shaft, said second shaft projecting beyond said platen on one end thereof, a housing having a bore receiving said second shaft, a gear in said housing and keyed to said second shaft, a third shaft in said housing, a segmental gear mounted on said third shaft, said segmental gear having a hub thereon, a connecting bar pivoted to said hub, a second segmental gear mounted in said housing above the swivel arm, a second hub on said second segmental gear and engaging said connecting bar, a gear on said first shaft and meshing with said second segmental gear, a collar keyed on said first shaft, an ear on said collar, a disk on first shaft, means to prevent rotation of said disk, stop pins on said disk, said ear being adapted to engage either of said stop pins and a crank on said second shaft.

11. In an apparatus for making a mold member, a base, an arm swivelly mounted on the base for movement about a horizontal axis, a vertical cylinder on the base and spaced from the swivel arm, a piston in the cylinder, means to actuate the cylinder, a piston head on the piston, resilient means to limit the upward movement of the cylinder head, a link, a pin swivelly connecting said link to the cylinder head, a second pin swivelly connecting the link to the swivel arm, a second link swivelly mounted on said first pin, a lifting fork, means to swivelly mount the lifting fork intermediate its length to said second link, a shaft on said swivel arm swivelly engaging the lifting fork, said lifting fork, links and swivel arm being disposed to form a parallel link motion, said lifting fork having spaced arms, bearings in said spaced arms, a second shaft in said bearings, a platen keyed to said second shaft, said second shaft projecting beyond said platen on one end thereof, a housing having a bore receiving said second shaft, a gear in said housing and keyed to said second shaft, a third shaft in said housing, a segmental gear mounted on said third shaft, said segmental gear having a hub thereon, a connecting bar pivoted to said hub, said housing including a portion disposed above said swivel arm, a second segmental gear mounted in said housing above the swivel arm, a second hub on said second segmental gear and engaging said connecting bar, a gear on said first shaft and meshing with said second segmental gear, a collar keyed on said first shaft, an ear on said collar, a disk on first shaft, means to prevent rotation of said disk, stop pins on said disk, said ear being adapted to engage either of said stop pins and a crank on said second shaft for rotating said second shaft.

12. In an apparatus for making a mold member, a pair of spaced, parallel link members, a second pair of spaced, parallel, link members pivotally connected to the first pair of link members to form a parallel link motion, means to rotatably support one end of one of the second pair of link members, one of said second pair of link members having a platen supporting portion therein, a platen rotatably mounted on said platen supporting portion, a table adapted to support said platen in one position of the link members and means to move the link members to thereby move the platen towards and from the platen supporting table.

13. In an apparatus for making a mold member, a pair of spaced, parallel, substantially vertically arranged, link members, a second pair of vertically spaced, parallel link members pivotally connected to said first mentioned link member to form a parallel link motion, means to rotatably support one end of the lower one of the second pair of link members, one of said second pair of link members having a projecting portion, a platen rotatably mounted on said projecting portion, a table adapted to support said platen in one position of the link members and means to move the link members to thereby move the platen towards and from the platen supporting table.

14. In an apparatus for making a mold member, a pair of spaced parallel substantially vertically arranged link members, a second pair of vertically spaced parallel link members pivotally connected to said first mentioned link member to form a parallel link motion, means to rotatably support one end of the lower one of the second pair of link members, one of said second pair of link members having a projecting portion, a platen rotatably mounted on said projecting portion, a table adapted to support said platen in one position of the link members and means to reciprocate the other end of the lower one of the second pair of link members.

RAYMOND H. OSBRINK.